US012651862B2

(12) United States Patent
Chen et al.

(10) Patent No.: US 12,651,862 B2
(45) Date of Patent: Jun. 9, 2026

(54) COMBINED ELECTRICAL CONNECTOR WITH TONGUE COMPONENT HAVING A TONGUE BRIDGING CONDUCTIVE METAL

(71) Applicant: Tarng Yu Enterprise co., ltd., New Taipei City (TW)

(72) Inventors: Ying-Chung Chen, New Taipei City (TW); Mu-Jung Huang, New Taipei City (TW)

(73) Assignee: TARNG YU ENTERPRISE CO., LTD., New Taipei City (TW)

( * ) Notice: Subject to any disclaimer, the term of this patent is extended or adjusted under 35 U.S.C. 154(b) by 397 days.

(21) Appl. No.: 18/518,911

(22) Filed: Nov. 24, 2023

(65) Prior Publication Data

US 2024/0178607 A1 May 30, 2024

(30) Foreign Application Priority Data

Nov. 25, 2022 (TW) ................................. 111145327

(51) Int. Cl.
*H01R 13/516* (2006.01)
*H01R 12/71* (2011.01)
*H01R 13/502* (2006.01)

(52) U.S. Cl.
CPC ......... *H01R 13/516* (2013.01); *H01R 12/716* (2013.01); *H01R 13/502* (2013.01)

(58) Field of Classification Search
CPC ... H01R 13/516; H01R 13/502; H01R 12/716
See application file for complete search history.

(56) References Cited

U.S. PATENT DOCUMENTS

| | | | | |
|---|---|---|---|---|
| 9,972,945 B1 * | 5/2018 | Huang | H01R 13/6585 | |
| 11,411,355 B2 * | 8/2022 | Lv | H01R 13/506 | |
| 11,605,922 B2 * | 3/2023 | Chen | H01R 13/516 | |
| 12,080,963 B1 * | 9/2024 | Chen | H01R 11/01 | |
| 12,322,901 B2 * | 6/2025 | Guo | H01R 13/6275 | |
| 12,451,653 B2 * | 10/2025 | Guo | H01R 13/6335 | |
| 2020/0076135 A1 * | 3/2020 | Tang | H01R 12/721 | |
| 2021/0234291 A1 * | 7/2021 | Zerebilov | H01R 13/502 | |
| 2021/0242616 A1 * | 8/2021 | Omodachi | H01R 12/7005 | |
| 2021/0313721 A1 * | 10/2021 | Little | H01R 13/6272 | |
| 2023/0208060 A1 * | 6/2023 | Chen | H01R 12/716 | 439/62 |
| 2023/0208068 A1 * | 6/2023 | Chen | H01R 13/64 | 439/527 |
| 2023/0238746 A1 * | 7/2023 | Liu | H01R 13/6596 | 439/607.05 |
| 2024/0178598 A1 * | 5/2024 | Chen | H01R 12/716 | |
| 2025/0023266 A1 * | 1/2025 | Cheng | H01R 13/6471 | |
| 2025/0253592 A1 * | 8/2025 | Chen | H01R 13/6585 | |
| 2025/0379384 A1 * | 12/2025 | Han | H01R 12/91 | |

* cited by examiner

*Primary Examiner* — Harshad C Patel
(74) *Attorney, Agent, or Firm* — LANWAY IPR SERVICES; Chun-Ming Shih

(57) ABSTRACT

A type of combined electrical connector is at least made by combining an outer shell component and a tongue component. The tongue component at least consists of a tongue major conductive terminal assembly and a tongue minor conductive terminal assembly. Therefore, after the electrical connector design is completed, customization of the quantity, structure, and electrical connection relationships of the conductive terminals can still be achieved by adjusting the outer shell component and the tongue component to meet the specific requirements and advancements in electronic devices.

14 Claims, 14 Drawing Sheets

A-A

C-C

COMBINED ELECTRICAL CONNECTOR WITH TONGUE COMPONENT HAVING A TONGUE BRIDGING CONDUCTIVE METAL

CROSS-REFERENCE TO RELATED APPLICATIONS

This application claims the priority of Republic of China Patent Application No. 111145327 filed on Nov. 25, 2022, in the State Intellectual Property Office of the R.O.C., the disclosure of which is incorporated herein by reference.

BACKGROUND OF THE INVENTION

Field of the Invention

This application is related to the field of electronic device technology, more specifically, it relates to a combined electrical connector that allows for the customization of the number, structure, and electrical connections of conductive terminals.

Descriptions of the Related Art

In various modern electronic devices, electrical connectors are typically employed to provide signal transmission. However, to meet the specific requirements and advancements in electronic devices, there is a demand for the customization of the number and structure of the conductive terminals in electrical connectors. Presently, once the design of an electrical connector is finalized, the number, the structure, and the electrical connections of conductive terminals become fixed and cannot be customized. This limitation makes it challenging to fulfill the signal transmission needs of electronic devices, ultimately restricting the technological (functional) development of electronic devices.

Furthermore, there might be a need for certain conductive terminals on an electrical connector to be electrically connected to each other. Currently, in the industry, the only solution for achieving electrical connections between certain conductive terminals on an electrical connector is to add jumper adaptors that are compatible with the connector. However, adding these jumper adaptors occupies the internal space of electronic devices, which, in turn, hinders the ongoing trend of making electronic devices smaller and more compact.

Given this situation, customizing the number and structure of the conductive terminals on an electrical connector has become a pressing technical challenge that the industry is eager to overcome.

SUMMARY OF THE INVENTION

In view of the drawbacks of the prior art mentioned above, the present application provides a combined electrical connector, which is equipped with a joining component, comprising: an outer shell component providing joining with the joining component wherein the outer shell component has an outer shell terminal joining port; a tongue component including a tongue conductive plastic base, a tongue insulating terminal frame, a tongue bridging conductive metal, a tongue major conductive terminal assembly, and a tongue minor conductive terminal assembly; wherein the tongue major conductive terminal assembly includes a plurality of tongue major bridging conductive terminals and a tongue major non-bridging conductive terminal, and the tongue minor conductive terminal assembly includes a plurality of tongue minor bridging conductive terminals and a tongue minor non-bridging conductive terminal; the tongue bridging conductive metal comprises a tongue conductive metal connection structure, a tongue conductive metal major abutting structure, and a tongue conductive metal minor abutting structure; the tongue conductive plastic base includes a tongue conductive plastic base separation wall, a tongue conductive plastic base major abutting channel, and a tongue conductive plastic base minor abutting channel; the tongue insulating terminal frame includes a tongue insulating terminal frame major joining structure and a tongue insulating terminal frame minor joining structure, and the tongue insulating terminal frame major joining structure and the tongue insulating terminal frame minor joining structure are used to respectively join with one side of the tongue major conductive terminal assembly and the tongue minor conductive terminal assembly, providing positioning for the tongue major conductive terminal assembly and the tongue minor conductive terminal assembly; wherein the tongue conductive plastic base, the tongue insulating terminal frame, the tongue bridging conductive metal, the tongue major conductive terminal assembly, and the tongue minor conductive terminal assembly are combined to form a tongue component combination, within the tongue component combination, the tongue major conductive terminal assembly and the tongue minor conductive terminal assembly are away from the tongue conductive plastic base separation wall, and the tongue conductive plastic base separation wall separates the tongue major conductive terminal assembly from the tongue minor conductive terminal assembly, wherein the tongue conductive metal connection structure extends to respectively cross over the tongue major non-bridging conductive terminal and the tongue minor non-bridging conductive terminal, allowing the tongue conductive metal connection structure to respectively electrically connect with the tongue conductive metal major abutting structure and the tongue conductive metal minor abutting structure, and the tongue conductive metal major abutting structure abuts to each of the tongue major bridging conductive terminals via the tongue conductive plastic base major abutting channel, and the tongue conductive metal minor abutting structure abuts to each of the tongue minor bridging conductive terminals via the tongue conductive plastic base minor abutting channel, allowing for the electrical connection of each of the tongue major bridging conductive terminals and each of the tongue minor bridging conductive terminals; and the tongue component is embedded within the outer shell component to form an electrical connector combination, in the electrical connector combination, the contact area of the tongue major conductive terminal assembly and the tongue minor conductive terminal assembly are exposed on the outer shell terminal joining port, allowing the contact area of tongue major conductive assembly and the tongue minor conductive assembly is electrically connected with the joining component when the outer shell component is joined to the joining component.

Preferably, the combined electrical connector said above, wherein the outer shell component further includes an outer shell lingual structure, an outer shell bottom embedding port, and an outer shell interior space, and the outer shell bottom embedding port is located at the bottom of the outer shell lingual structure, while the outer shell interior space is positioned within the interior of the outer shell lingual structure, wherein the outer shell terminal joining port is positioned on the side wall of the outer shell lingual structure, and the tongue component can enter the outer shell interior space through the outer shell bottom embedding port, thereby exposing the contact area of the tongue major conductive terminal assembly and the tongue minor conductive terminal assembly on the outer shell terminal joining port.

Preferably, the combined electrical connector said above, wherein the outer shell component further includes an outer shell component major separation structure and an outer shell component minor separation structure, in the electric connector combination, the outer shell major component separation structure serves to separate adjacent pairs of the plurality of the tongue major bridging conductive terminals from the tongue major non-bridging conductive terminal, and the outer shell minor component separation structure serves to separate adjacent pairs of the plurality of the tongue minor bridging conductive terminals from the tongue minor non-bridging conductive terminal.

Preferably, the combined electrical connector said above, wherein the outer shell component major separation structure and the outer shell component minor separation structure are fence-like structure.

Preferably, the combined electrical connector said above, wherein the tongue conductive plastic base further includes a tongue conductive plastic base supporting structure, and the tongue conductive plastic base supporting structure provides support to the tongue conductive metal connection structure, allowing the tongue conductive metal connection structure to extend on the tongue conductive plastic base.

Preferably, the combined electrical connector said above, wherein the tongue conductive metal connection structure spans across the tongue conductive plastic base separation wall.

Preferably, the combined electrical connector said above, wherein the tongue bridging conductive metal further includes a tongue conductive metal major separation structure and a tongue conductive metal minor separation structure, and the tongue conductive metal major separation structure extends along the tongue conductive plastic base separation wall, bridging over the tongue major non-bridging conductive terminal to separate the tongue major non-bridging conductive terminal from the tongue minor conductive terminal assembly, wherein the tongue conductive metal minor separation structure extends along the tongue conductive plastic base separation wall, bridging over the tongue minor non-bridging conductive terminals to separate the tongue major conductive terminal assembly from the tongue minor non-bridging conductive terminal.

Preferably, the combined electrical connector said above, wherein the tongue conductive plastic base further includes a tongue conductive plastic base major extension channel and a tongue conductive plastic base minor extension channel, and the tongue conductive metal major separation structure extends within the tongue conductive plastic base major extension channel, while the tongue conductive metal minor separation structure extends within the tongue conductive plastic base minor extension channel.

Preferably, the combined electrical connector said above, wherein the tongue conductive metal connection structure, the tongue conductive metal major separation structure, and the tongue conductive metal minor separation structure are interconnected to form a tongue conductive metal structure, and the tongue conductive metal structure has a U-shaped cross-section.

Preferably, the combined electrical connector said above, wherein the tongue insulation terminal frame further includes a tongue insulation terminal frame joining structure, in the electrical connector combination, the tongue insulation terminal frame joining structure is used to connect to the outer shell component through a snap-in, fastening, or interference method.

Preferably, the combined electrical connector said above, wherein the tongue conductive metal major abutting structure comprises a tongue conductive metal major first abutting substructure and a tongue conductive metal major second abutting substructure, and the tongue conductive metal major first abutting substructure is used to abut against each of the tongue major bridging conductive terminals at a tongue conductive metal major first abutting position, while the tongue conductive metal major second abutting substructure is used to abut against each of the tongue major bridging conductive terminals at a tongue conductive metal major second abutting position, wherein the tongue conductive metal major first abutting position and the tongue conductive metal major second abutting position are different; the tongue conductive metal minor abutting structure comprises a tongue conductive metal minor first abutting substructure and a tongue conductive metal minor second abutting substructure, and the tongue conductive metal minor first abutting substructure is used to abut against each of the tongue minor bridging conductive terminals at a tongue conductive metal minor first abutting position, while the tongue conductive metal minor second abutting substructure is used to abut against each of the tongue minor bridging conductive terminals at a tongue conductive metal minor second abutting position, wherein the tongue conductive metal minor first abutting position and the tongue conductive metal minor second abutting position are different.

Preferably, the combined electrical connector said above, wherein the tongue insulation terminal frame comprises a tongue insulation terminal frame major component and a tongue insulation terminal frame minor component, and the tongue insulation terminal frame major joining structure is located on the tongue insulation terminal frame major component, and the tongue insulation terminal frame minor joining structure is located on the tongue insulation terminal frame minor component, wherein the tongue insulation terminal frame major component includes a tongue insulation terminal frame major assembly structure, while the tongue insulation terminal frame minor component includes a tongue insulation terminal frame minor assembly structure, the tongue insulation terminal frame major assembly structure and the tongue insulation terminal frame minor assembly structure are structurally coordinated, allowing the tongue insulation terminal frame major component and the tongue insulation terminal frame minor component to be assembled into a tongue insulation terminal frame combination.

Preferably, the combined electrical connector said above, wherein the tongue conductive plastic base further includes a tongue conductive plastic base assembly structure, and the tongue conductive plastic base assembly structure is respectively structurally coordinated with the tongue insulation terminal frame major assembly structure and the tongue insulation terminal frame minor assembly structure, enabling the tongue insulation terminal frame major component and the tongue insulation terminal frame minor component to be assembled into the tongue insulation terminal frame combination.

Preferably, the combined electrical connector said above, wherein the tongue conductive plastic base assembly structure, the tongue insulation terminal frame major assembly structure, and the tongue insulation terminal frame minor assembly structure are designed with a protrusion and recess structure which are structurally coordinated.

In comparison to prior art, the combined electrical connector provided in this application is at least composed of an outer shell component and a tongue component. The tongue component is at least composed of a tongue conductive plastic base, a tongue insulation terminal frame, a tongue bridging conductive metal, a tongue major conductive terminal assembly, and a tongue minor conductive terminal assembly. Therefore, after the electrical connector design is completed, customization and adjustment of the quantity, structure, and electrical connection relationship of the conductive terminals of the electrical connector can still be achieved by adjusting the outer shell component and the tongue component. This allows meeting the specific requirements and developments of electronic devices.

Additionally, the tongue bridging conductive metal can achieve electrical connection between certain conductive terminals of the electrical connector, reducing signal crosstalk between certain conductive terminals of the electrical connector to enhance the transmission speed and quality of signal of the electrical connector. Furthermore, this application eliminates the need for additional jumper adapters to achieve electrical connection between certain conductive terminals in the electrical connector to allow electronic devices equipped with the combined electrical connector disclosed in this application to continue evolving towards a direction of being lightweight, compact, and small.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

Figure 1:
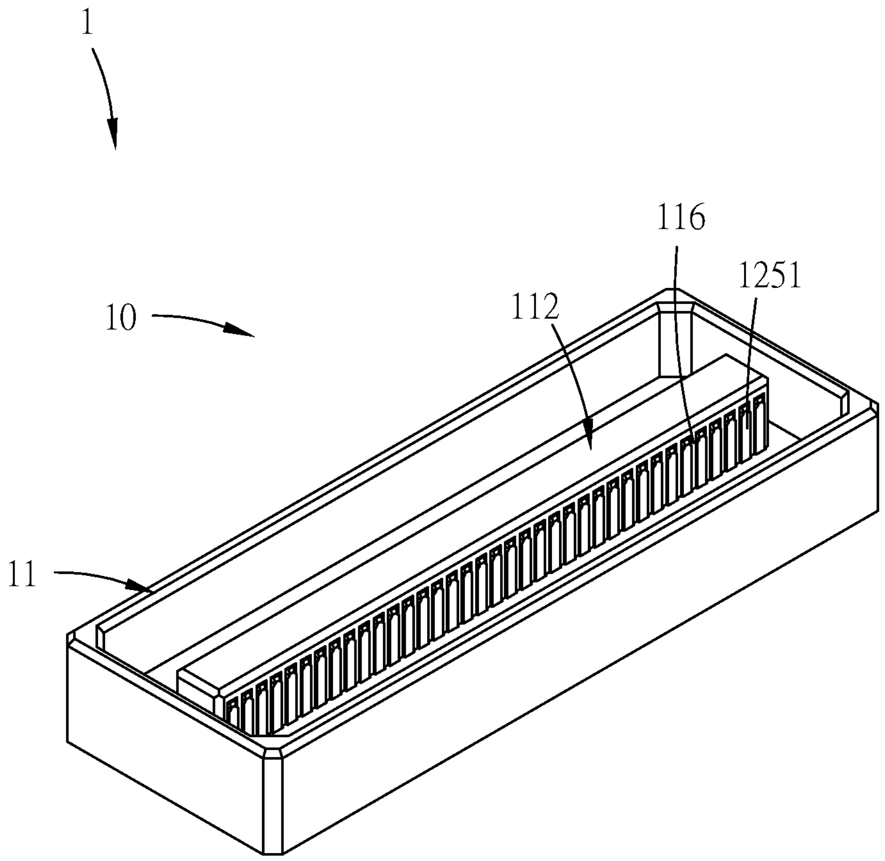
FIG. 1 is a three-dimensional schematic diagram of the embodiment of the combined electrical connector in the present application.
Figure 2:
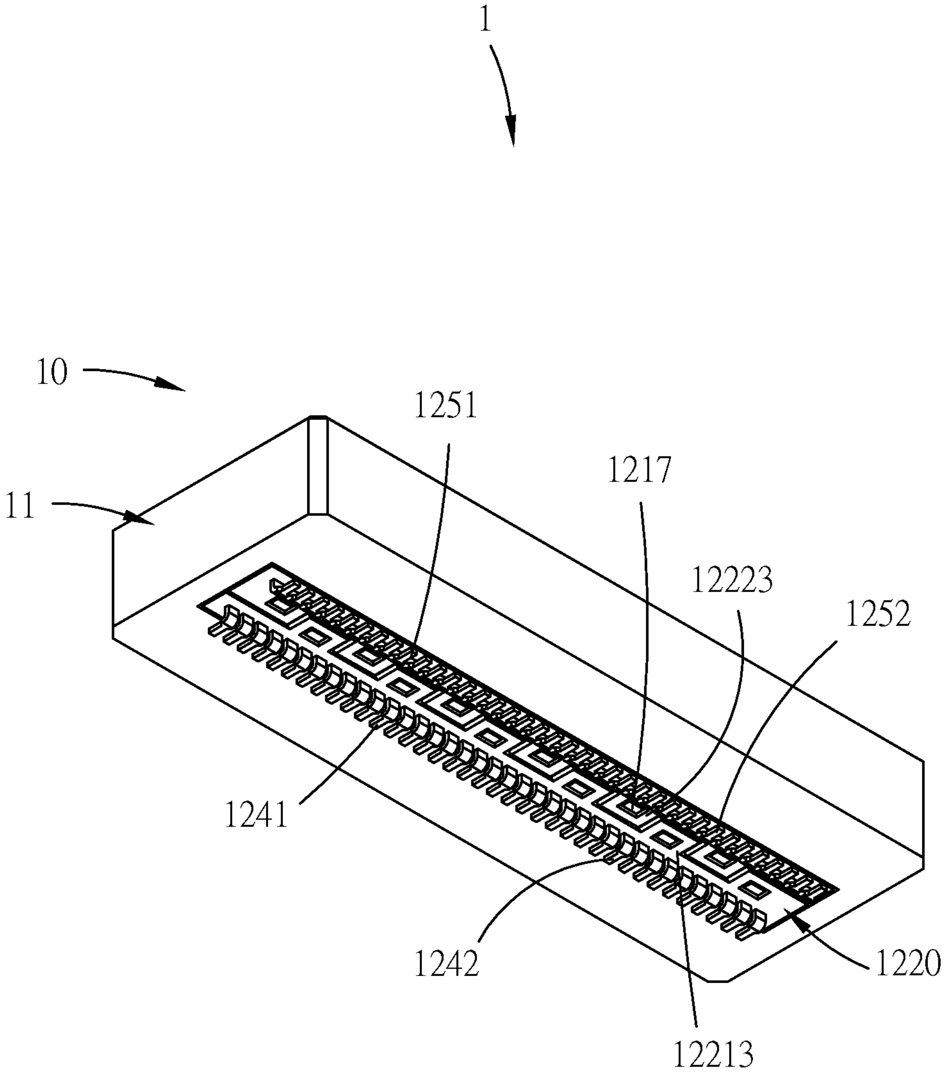
FIG. 2 is a three-dimensional schematic diagram of the embodiment of the combined electrical connector in the present application.
Figure 3:
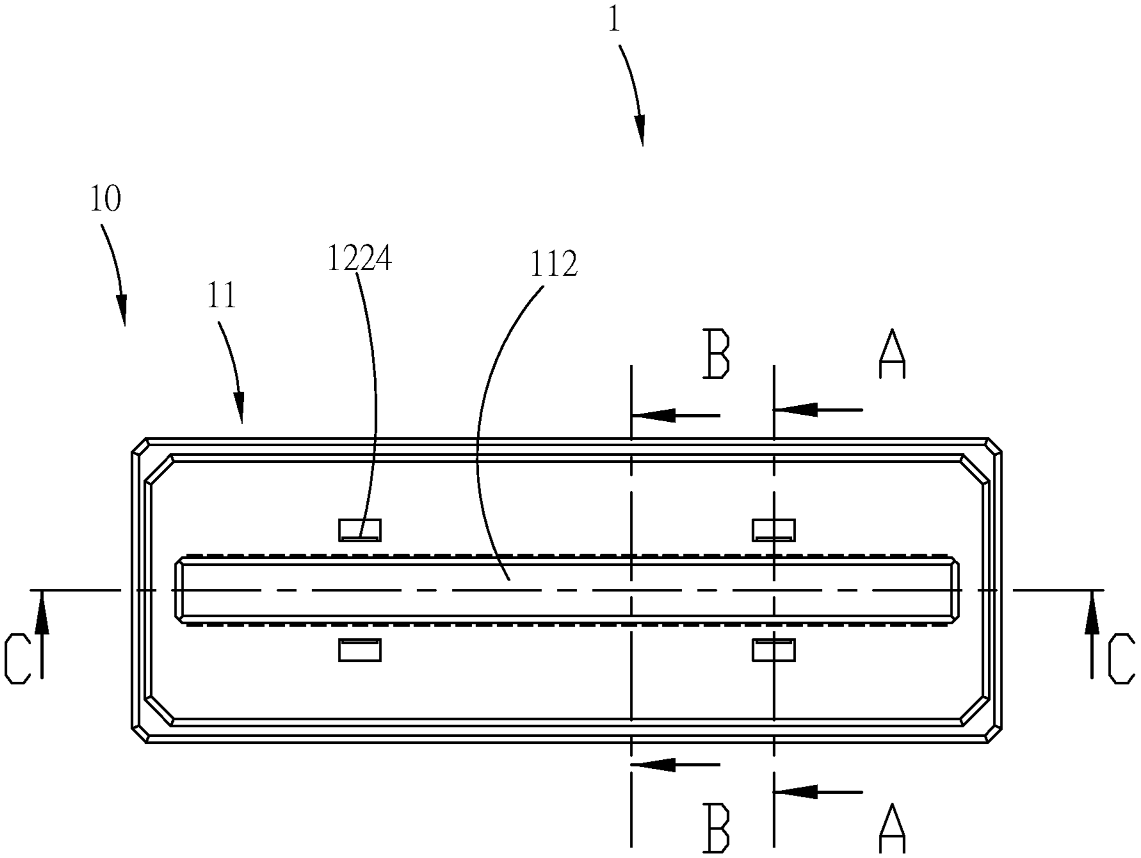
FIG. 3 is a top view schematic diagram of some components of an embodiment of the combined electrical connector according to the present application.
Figure 4:
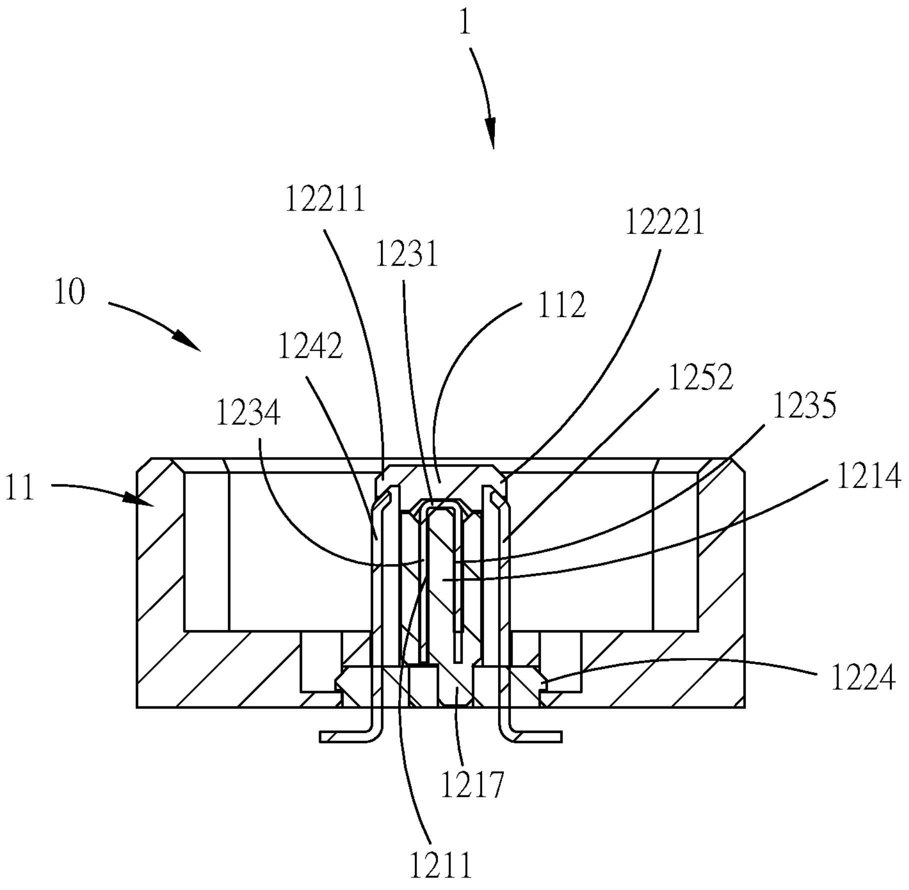
FIG. 4 is a sectional schematic diagram of some components of the combined electrical connector shown in FIG. 3 cut along the line AA.
Figure 5:
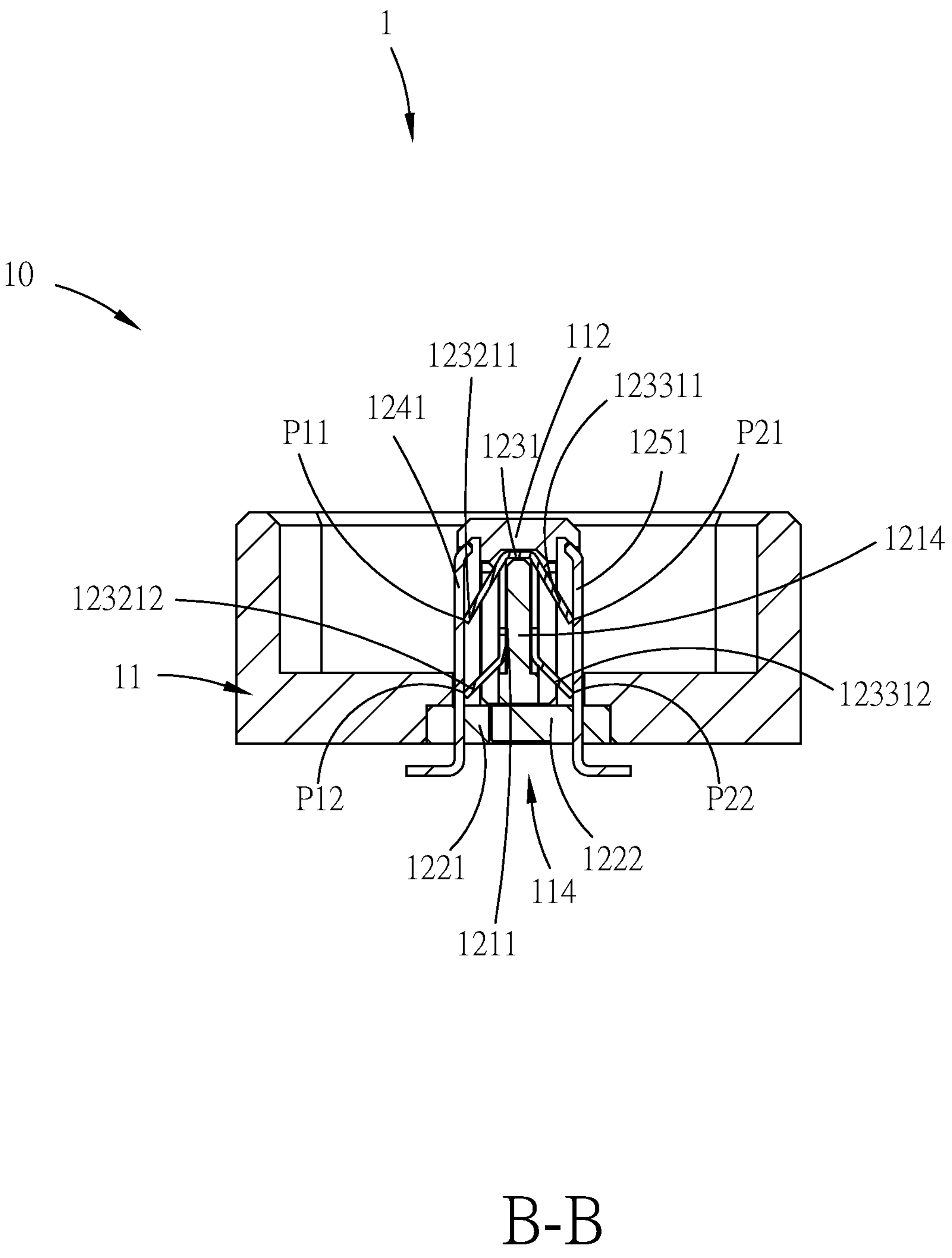
FIG. 5 is a sectional schematic diagram of some components of the combined electrical connector shown in FIG. 3 cut along the line BB.
Figure 6:
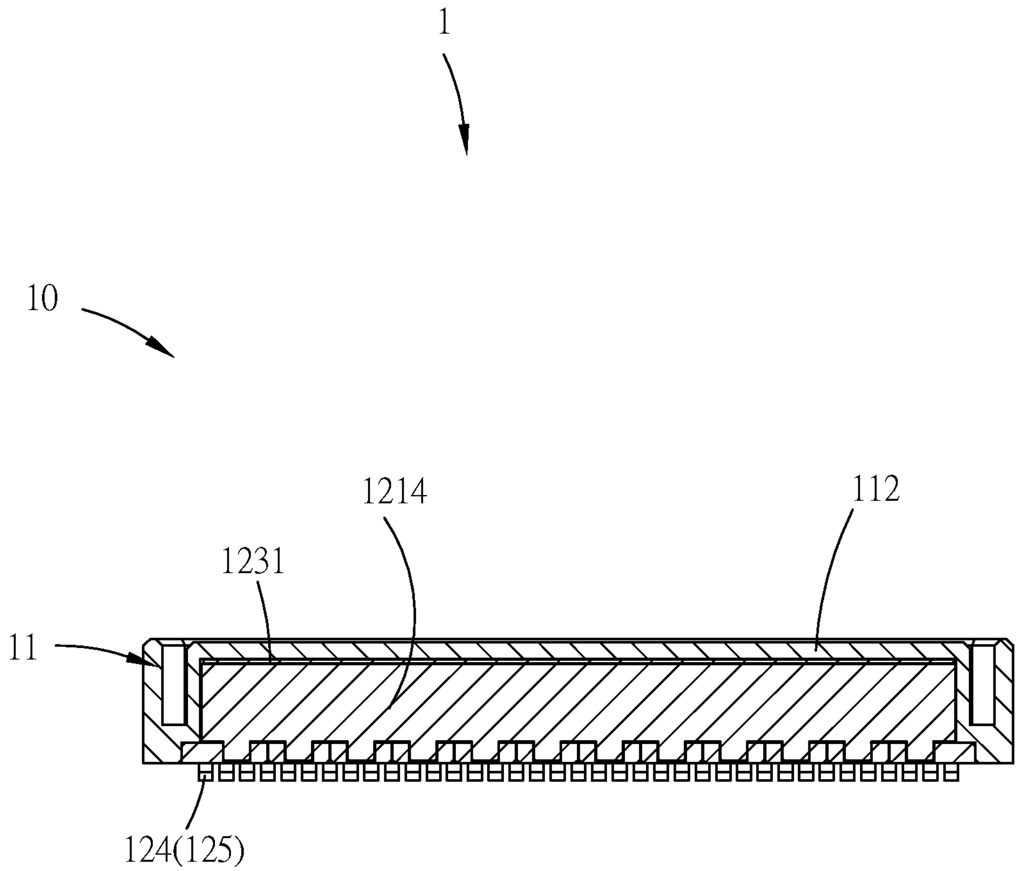
FIG. 6 is a sectional schematic diagram of some components of the combined electrical connector shown in FIG. 3 cut along the line CC.
Figure 7:
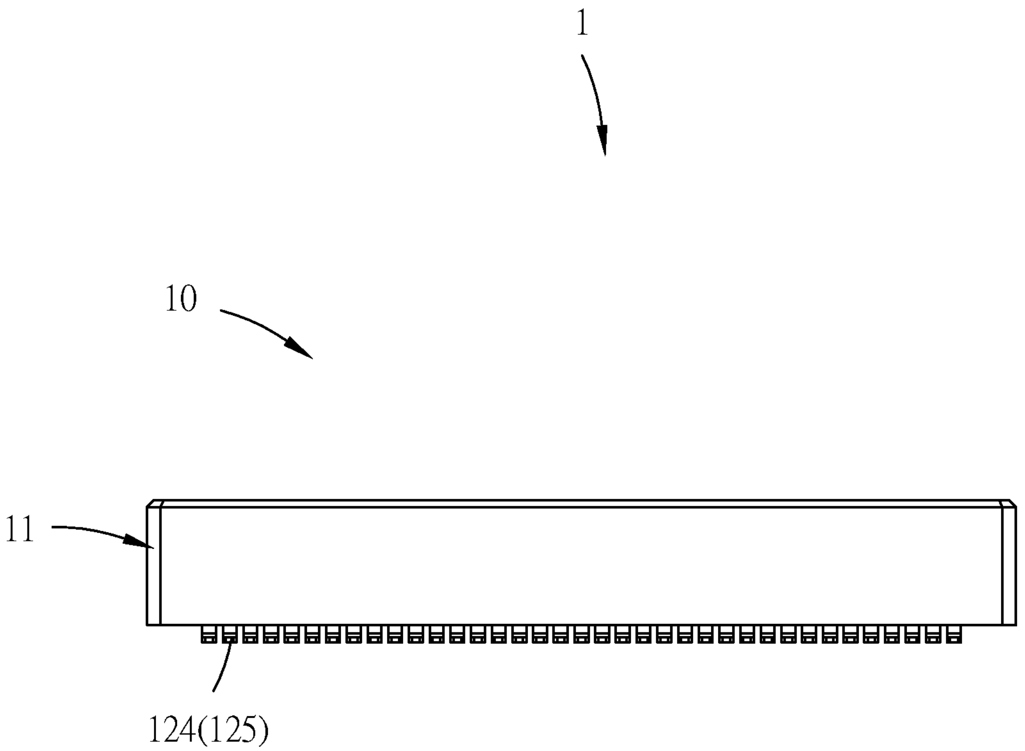
FIG. 7 is a side view schematic diagram of some components of an embodiment of the combined electrical connector according to the present application.
Figure 8:
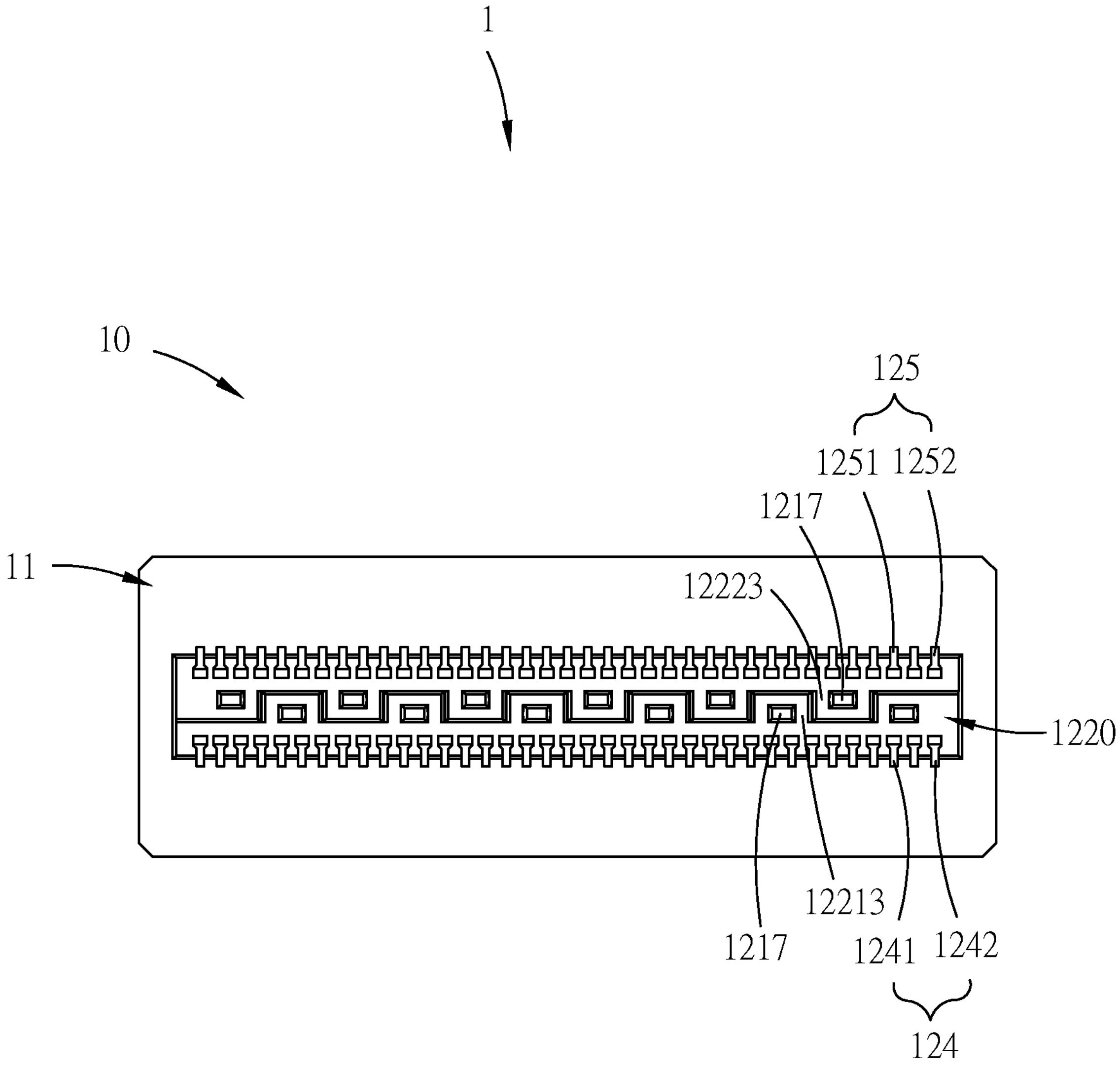
FIG. 8 is a bottom view schematic diagram of some components of an embodiment of the combined electrical connector according to the present application.
Figure 9:
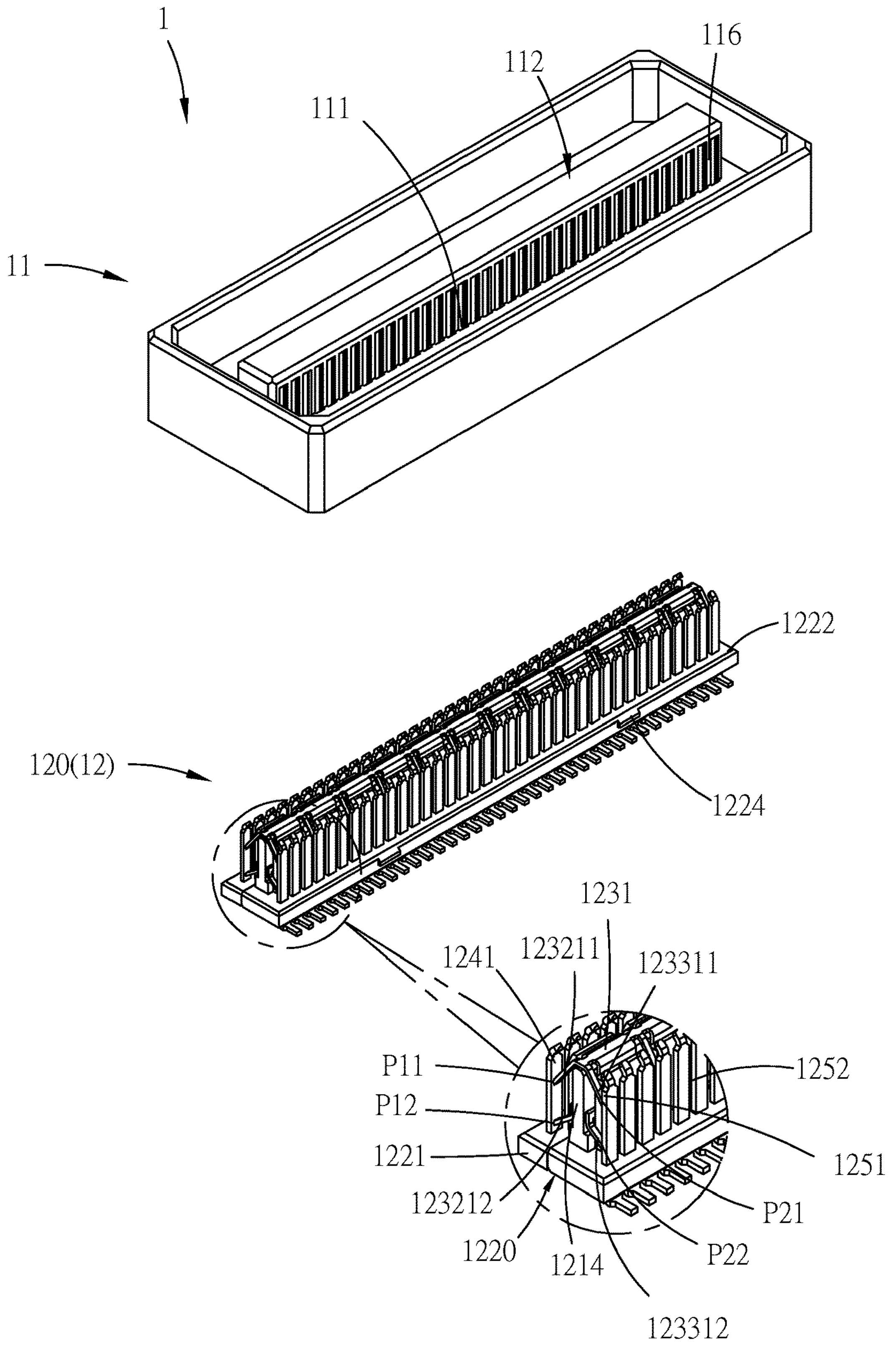
FIG. 9 is a three-dimensional schematic diagram of some components of an embodiment of the combined electrical connector according to the present application.
Figure 10:
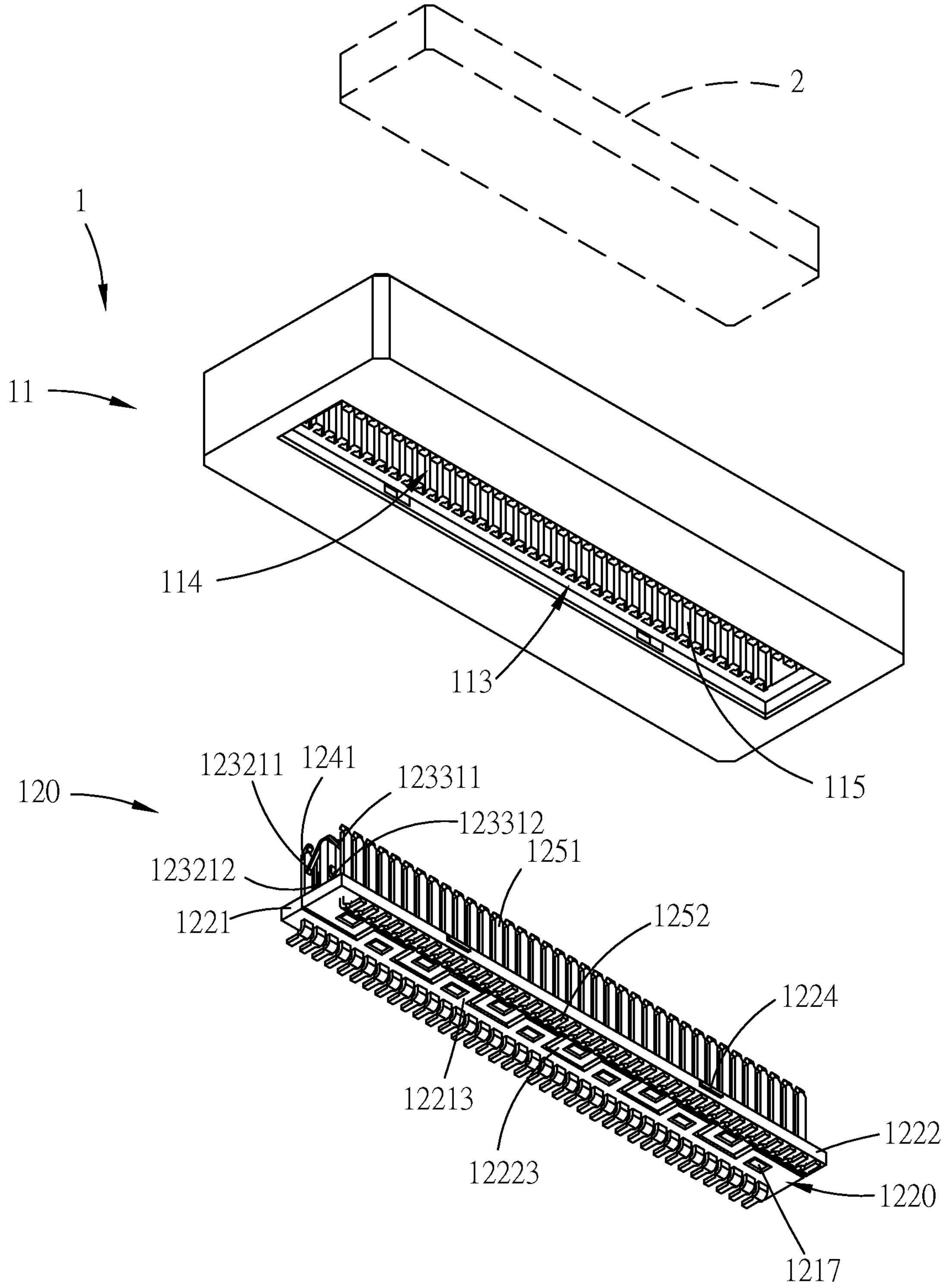
FIG. 10 is a three-dimensional schematic diagram of some components of an embodiment of the combined electrical connector according to the present application.
Figure 11:
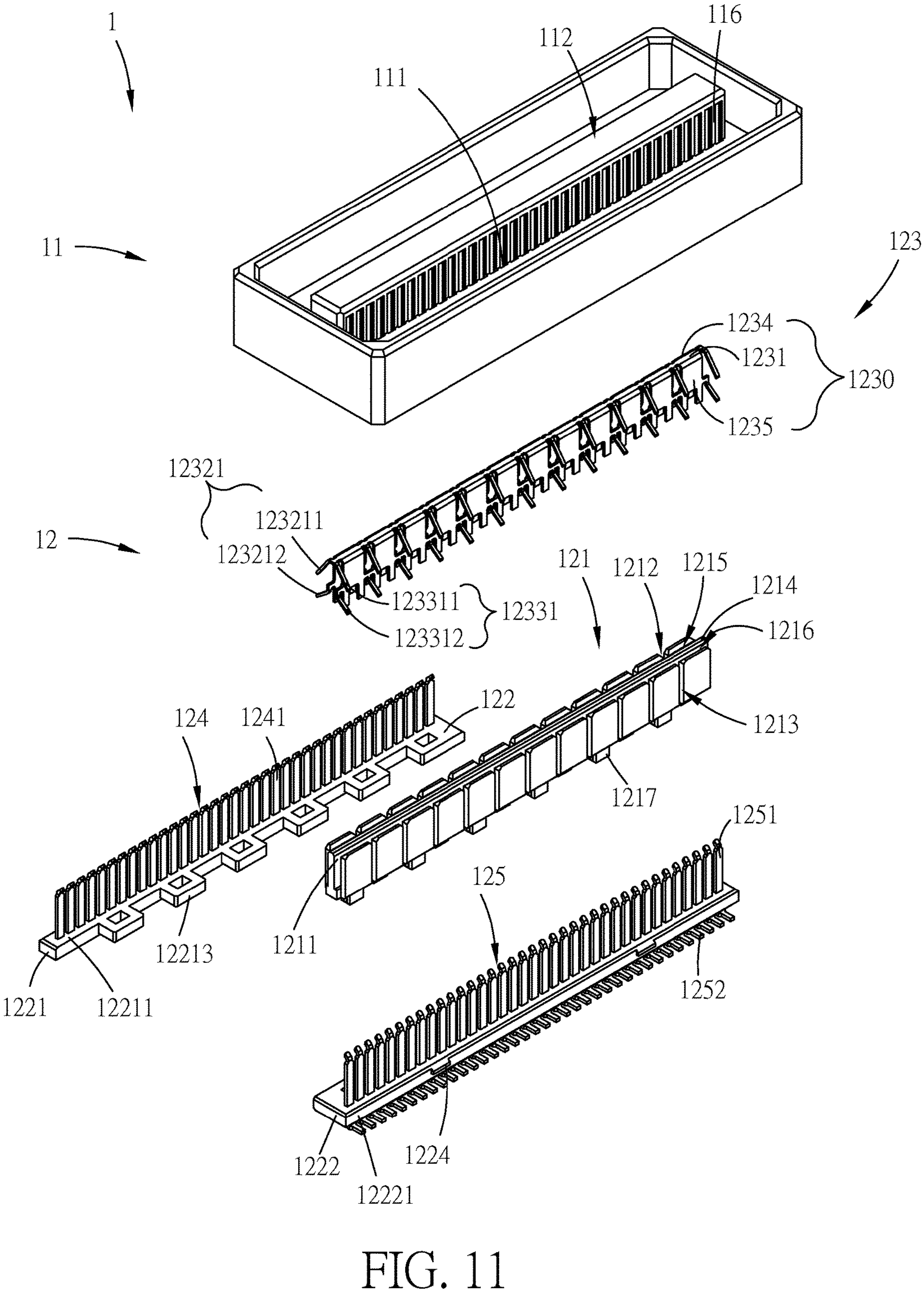
FIG. 11 is a three-dimensional schematic diagram of some components of an embodiment of the combined electrical connector according to the present application.
Figure 12:
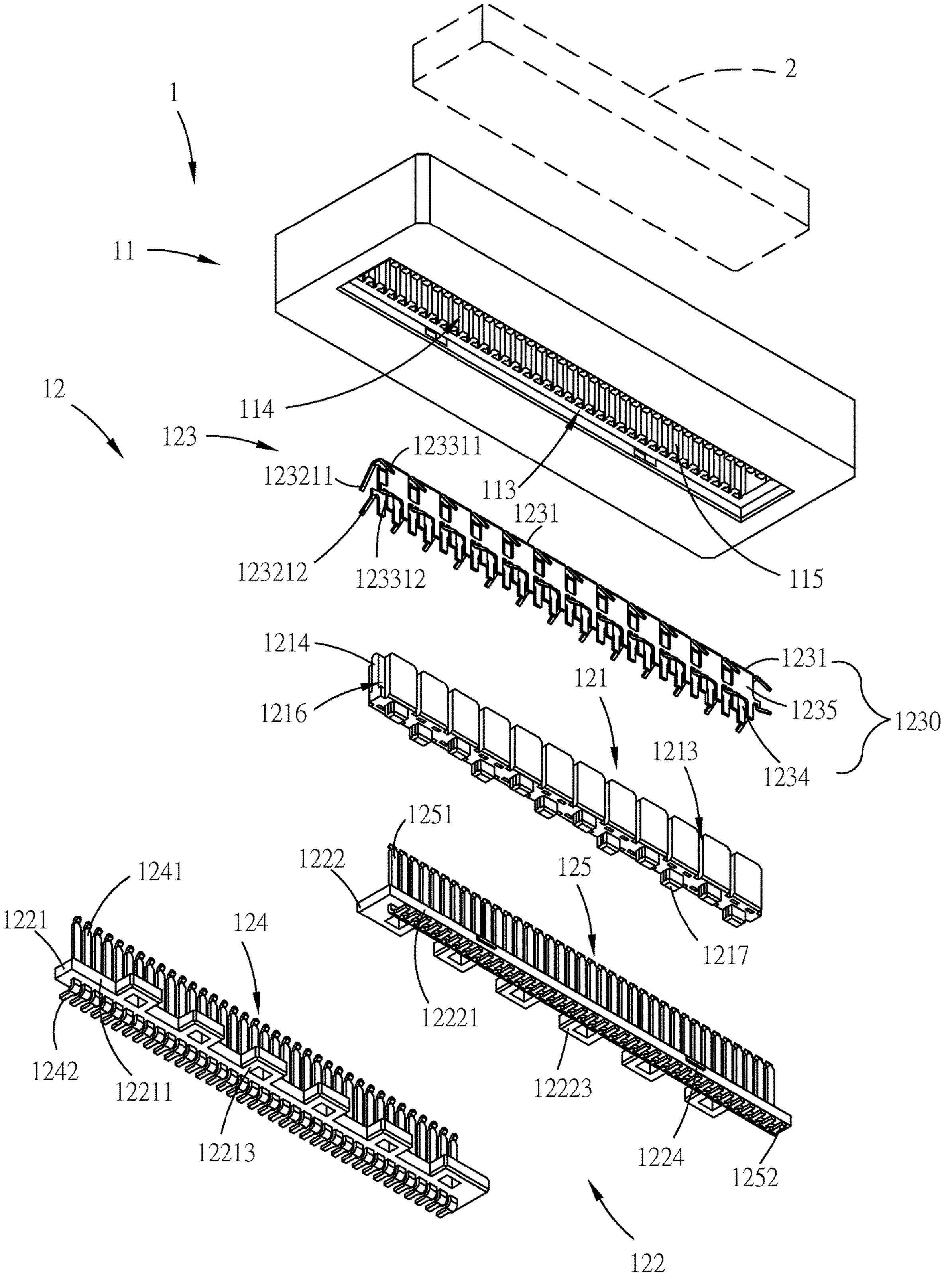
FIG. 12 is a three-dimensional schematic diagram of some components of an embodiment of the combined electrical connector according to the present application.
Figure 13:
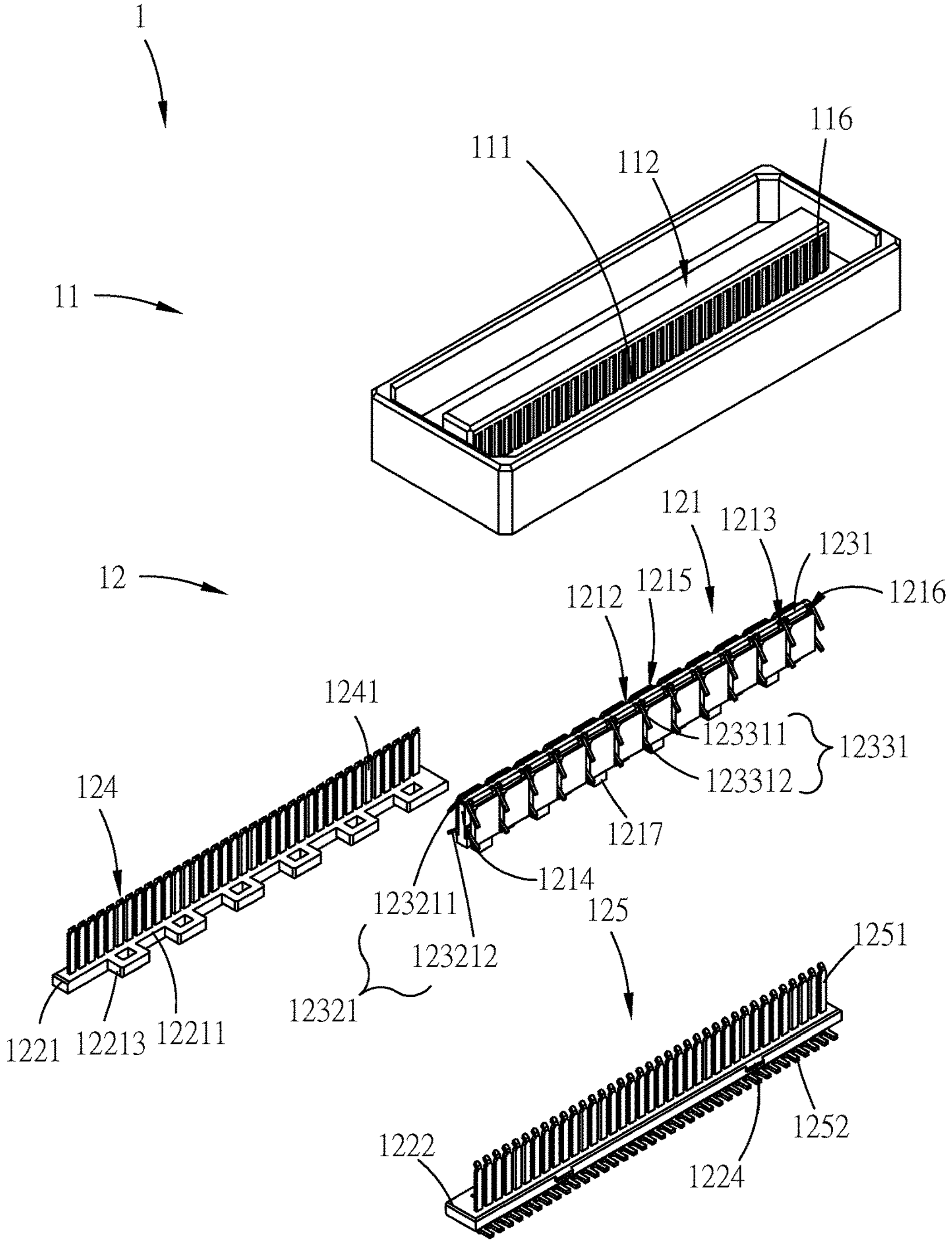
FIG. 13 is a three-dimensional schematic diagram of some components of an embodiment of the combined electrical connector according to the present application.
Figure 14:
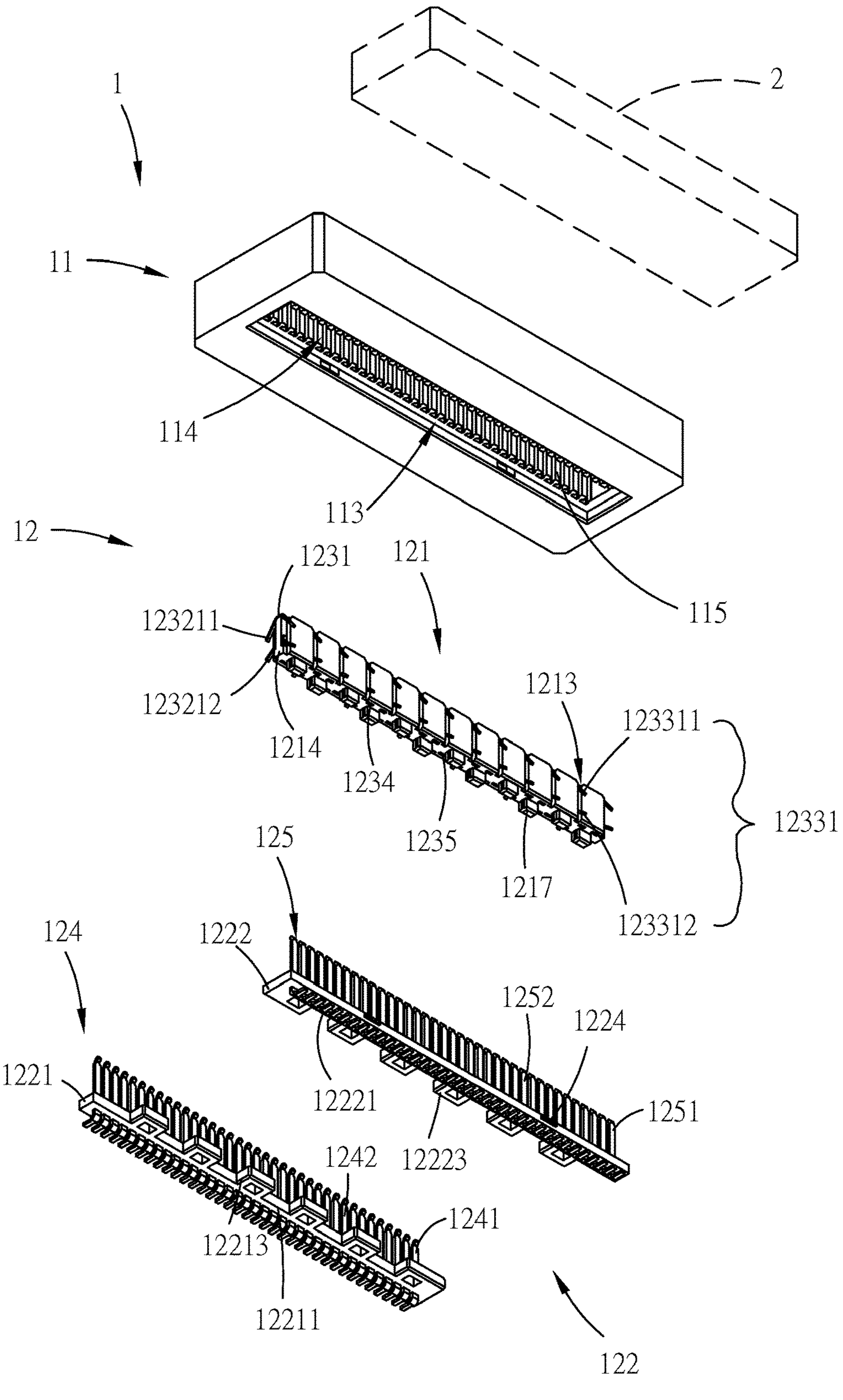
FIG. 14 is a three-dimensional schematic diagram of some components of an embodiment of the combined electrical connector according to the present application.

For a detailed description of the embodiments disclosed in the present application, please refer to FIGS. 1 to 14.

The present application provides a combined electrical connector that can be used for signal transmission in conjunction with a joining component. In the embodiments shown in FIGS. 1 to 14 of this application, the combined electrical connector 1 is a board end electrical connector installed on a circuit board to provide signal transmission, while the joining component 2 is a wire end electrical connector used for plugging into the board end electrical connector. The combined electrical connector 1 comprises an outer shell component 11 and a tongue component 12. The outer shell component 11, made of insulating material, serves to position the tongue component 12 and facilitate the joining with the joining component 2, while the tongue component 12 is designed for being equipped with the joining component 2.

In the embodiment said above, the outer shell component 11 includes an outer shell terminal joining port 111, an outer shell lingual structure 112, an outer shell bottom embedding port 113, an outer shell interior space 114, an outer shell component major separation structure 115, and an outer shell component minor separation structure 116. The outer shell lingual structure 112 provides to be equipped with the joining component 2. The outer shell bottom embedding port 113 is positioned at the bottom of the outer shell lingual structure 112. The outer shell interior space 114 is located within the outer shell lingual structure 112. The outer shell terminal joining port 111 is positioned on the side wall of the outer shell lingual structure 112.

In the embodiment said above, the tongue component 12 comprises a tongue conductive plastic base 121, a tongue insulation terminal frame 122, a tongue bridging conductive metal 123, a tongue major conductive terminal assembly 124, and a tongue minor conductive terminal assembly 125. The tongue major conductive terminal assembly 124 and the tongue minor conductive terminal assembly 125 can provide transmission of signal such as differential signal or ground signal. The tongue major conductive terminal assembly 124 has a plurality of tongue major bridging conductive terminals 1241 and tongue major non-bridging conductive terminals 1242. The tongue minor conductive terminal assembly 125 has a plurality of tongue minor bridging conductive terminals 1251 and tongue minor non-bridging conductive terminals 1252.

It should be noted that the plurality of tongue major bridging conductive terminals 1241 and the tongue minor bridging conductive terminals 1251 can provide transmission of ground signal. Additionally, the number of the tongue major bridging conductive terminal 1241 and the tongue minor bridging conductive terminal 1251 is not limited to multiple; it does not preclude the possibility of having only one tongue major bridging conductive terminal 1241 and one tongue minor bridging conductive terminal 1251. Furthermore, the number of the tongue major non-bridging conductive terminal 1242 and the tongue minor non-bridging conductive terminal 1252 is not limited to one; it does not preclude the possibility of having multiple tongue major non-bridging conductive terminals 1242 and the tongue minor non-bridging conductive terminals 1252.

In the embodiment said above, the tongue bridging conductive metal 123 comprises a tongue conductive metal connection structure 1231, a tongue conductive metal major abutting structure 12321, a tongue conductive metal minor abutting structure 12331, a tongue conductive metal major separation structure 1234, and a tongue conductive metal minor separation structure 1235. The tongue conductive metal connection structure 1231, the tongue conductive metal major separation structure 1234, and the tongue conductive metal minor separation structure 1235 are connected to form the tongue conductive metal structure 1230. The tongue conductive metal structure 1230 can be cut and bent from a metal sheet to form a structure with a U-shaped cross-section. The tongue conductive metal major abutting structure 12321 and the tongue conductive metal minor abutting structure 12331 can be formed by stamping the metal sheet, ensuring that the structural strength of the tongue conductive metal structure 1230 meets expectations.

It should be noted that, in the embodiment said above, the tongue conductive metal connection structure 1231, the tongue conductive metal major abutting structure 12321, the tongue conductive metal minor abutting structure 12331, the tongue conductive metal major separation structure 1234, and the tongue conductive metal minor separation structure 1235 are integrally formed as a unit. However, this is not limiting, and the tongue conductive metal connection structure 1231, the tongue conductive metal major abutting structure 12321, the tongue conductive metal minor abutting structure 12331, the tongue conductive metal major separation structure 1234, and the tongue conductive metal minor separation structure 1235 can be formed as separate components. In other words, the tongue bridging conductive metal 123 can be assembled from multiple components.

In the embodiment said above, the tongue conductive plastic base 121 is made of conductive plastic material and includes a tongue conductive plastic base separation wall 1211, a tongue conductive plastic base major abutting channel 1212, a tongue conductive plastic base minor abutting channel 1213, a tongue conductive plastic base supporting structure 1214, a tongue conductive plastic base major extension channel 1215, and a tongue conductive plastic base minor extension channel 1216.

In the embodiment said above, the tongue insulation terminal frame 122 is made of insulating material and includes a tongue insulation terminal frame major component 1221 and a tongue insulation terminal frame minor component 1222. The tongue insulation terminal frame major component 1221 has a tongue insulation terminal frame major joining structure 12211 and a tongue insulation terminal frame major assembly structure 12213. The tongue insulation terminal frame minor component 1222 has a tongue insulation terminal frame minor joining structure 12221 and a tongue insulation terminal frame minor assembly structure 12223.

It should be noted that, in the embodiment said above, the tongue insulation terminal frame major component 1221 and the tongue insulation terminal frame minor component 1222 are designed as different components, but this is not limiting. The tongue insulation terminal frame major component 1221 and the tongue insulation terminal frame minor component 1222 can be designed to be integrated into a single unit.

In the embodiment said above, the tongue insulation terminal frame major joining structure 12211 and the tongue insulation terminal frame minor joining structure 12221 are respectively joined to one side of the tongue major conductive terminal assembly 124 and the tongue minor conductive terminal assembly 125 to provide positioning for the tongue major conductive terminal assembly 124 and the tongue minor conductive terminal assembly 125, allowing the tongue major conductive terminal assembly 124 and the tongue minor conductive terminal assembly 125 to form a cantilever structure. The cantilever structure is employed to ensure that the electrical characteristics of the combined electrical connector 1 meet the expectations.

The tongue insulation terminal frame major assembly structure 12213 and the tongue insulation terminal frame minor assembly structure 12223 are structurally coordinated, allowing the tongue insulation terminal frame major component 1221 and the tongue insulation terminal frame minor component 1222 to be assembled into a single unit to form the tongue insulation terminal frame combination 1220. Correspondingly, the tongue conductive plastic base 121 has a tongue conductive plastic base assembly structure 1217. The tongue conductive plastic base assembly structure 1217 is structurally coordinated with the tongue insulation terminal frame major assembly structure 12213 and the tongue insulation terminal frame minor assembly structure 12223 to enable the tongue insulation terminal frame major component 1221 and the tongue insulation terminal frame minor component 1222 to be assembled into a single unit, forming the tongue insulation terminal frame combination 1220.

It should be noted that, in the embodiment said above, the tongue conductive plastic base assembly structure 1217, the tongue insulation terminal frame major assembly structure 12213, and the tongue insulation terminal frame minor assembly structure 12223 are structurally coordinated as complementary protrusion and recess structure to reduce the thickness dimension of the tongue insulation terminal frame combination 1220, allowing the size of the combined electrical connector 1 of the present application to decrease, allowing electronic devices using the combined electrical connector 1 of the present application to continue developing in the direction of being lightweight, compact, and small in size.

In addition, the tongue conductive plastic base 121, the tongue insulation terminal frame 122, the tongue bridging conductive metal 123, the tongue major conductive terminal assembly 124, and the tongue minor conductive terminal assembly 125 are assembled to form the tongue component combination 120. In the tongue component combination 120, the tongue conductive plastic base separation wall 1211 separates the tongue major conductive terminal assembly 124 and the tongue minor conductive terminal assembly 125 to reduce the signal crosstalk between the tongue major conductive terminal assembly 124 and the tongue minor conductive terminal assembly 125, thereby optimizing the transmission speed and quality of the electrical connector to meet the specific requirements and development of electronic devices.

The tongue conductive plastic base supporting structure 1214 provides support for the tongue conductive metal connection structure 1231, allowing the tongue conductive metal connection structure 1231 to span across or abut against the tongue conductive plastic base separation wall 1211 to allow the tongue conductive metal connection structure 1231 to extend over and respectively span across the tongue major non-bridging conductive terminal 1242 and the tongue minor non-bridging conductive terminal 1252. This results in the electrical connection of the tongue conductive metal connection structure 1231 to the tongue conductive metal major abutting structure 12321 and the tongue conductive metal minor abutting structure 12331, allowing the tongue conductive metal major abutting structure 12321 and the tongue conductive metal minor abutting structure 12331 to form a bridging circuit capable of transmitting ground signal.

Furthermore, in the tongue component combination 120, the tongue conductive metal major abutting structure 12321 is abutted to each of the tongue major bridging conductive terminals 1241 through the tongue conductive plastic base major abutting channel 1212. Additionally, the tongue conductive metal minor abutting structure 12331 is abutted to each of the tongue minor bridging conductive terminals 1251 through the tongue conductive plastic base minor abutting channel 1213. This allows the electrical connection of each of the tongue major bridging conductive terminals 1241 and each of the tongue minor bridging conductive terminals 1251 to form a bridging circuit capable of transmitting ground signal.

The combined electrical connector 1 of the present application achieves electrical connection between the conductive terminals of the electrical connector, eliminating the need for additional jumper adapters for electrical connection between the conductive terminals of the electrical connector. This allows electronic devices using the combined electrical connector 1 of the present application to continue developing in the direction of being lightweight, compact, and small. Additionally, the bridging circuit provides transmission of ground signal, enabling to reduce signal interference between the conductive terminals of the electrical connector and optimizing the transmission speed and quality of signal, meeting the specific needs and development requirements of electronic devices.

It should be noted that, in the embodiment said above, the tongue component 120 is formed by the combination of the tongue conductive plastic base 121, the tongue insulation terminal frame 122, the tongue bridging conductive metal 123, the tongue major conductive terminal assembly 124, and the tongue minor conductive terminal assembly 125. Therefore, after the electrical connector is designed, customization can still be achieved by separately adjusting the tongue conductive plastic base 121, the tongue insulation terminal frame 122, the tongue bridging conductive metal 123, the tongue major conductive terminal assembly 124, and the tongue minor conductive terminal assembly 125. This allows for the customized adjustment of the quantity, structure, and electrical connection relationships of the conductive terminals of the electrical connector to meet the specific needs and development of electronic devices.

In the embodiment said above, the tongue conductive metal major abutting structure 12321 comprises a tongue conductive metal major first abutting substructure 123211 and a tongue conductive metal major second abutting substructure 123212. The tongue conductive metal major first abutting substructure 123211 is designed to abut each of the tongue major bridging conductive terminals 1241 at the tongue conductive metal major first abutting site P11, and the tongue conductive metal major second abutting substructure 123212 is intended to abut each of the tongue major bridging conductive terminals 1241 at the tongue conductive metal major second abutting site P12. Notably, the tongue conductive metal major first abutting site P11 and the tongue conductive metal major second abutting site P12 are distinct to ensure that the tongue conductive metal major abutting structure 12321 abuts each of the tongue major bridging conductive terminals 1241 at both sites, thereby ensuring that the tongue bridging conductive metal 123 can abut each of the tongue major bridging conductive terminals 1241 to form a bridging circuit that provides a transmission for ground signal.

Additionally, the tongue conductive metal minor abutting structure 12331 comprises a tongue conductive metal minor first abutting substructure 123311 and a tongue conductive metal minor second abutting substructure 123312. The tongue conductive metal minor first abutting substructure 123311 is designed to abut each of the tongue minor bridging conductive terminals 1251 at the tongue conductive metal minor first abutting site P21, and the tongue conductive metal minor second abutting substructure 123312 is intended to abut each of the tongue minor bridging conductive terminals 1251 at the tongue conductive metal minor second abutting site P22. Notably, the tongue conductive metal minor first abutting site P21 and the tongue conductive metal minor second abutting site P22 are distinct to ensure that the tongue conductive metal minor abutting structure 12331 abuts each of the tongue minor bridging conductive terminals 1251 at both positions, thereby ensuring that the tongue bridging conductive metal 123 can abut each of the tongue minor bridging conductive terminals 1251 to form a bridging circuit that provides a transmission for ground signal.

In the embodiment said above, the tongue conductive metal major abutting structure 12321 is designed as a cantilever structure, allowing the tongue bridging conductive metal 123 to flexibly abut each of the tongue major bridging conductive terminals 1241, resulting in the tongue conductive metal major abutting structure 12321 achieving a better abutment with each of the tongue major bridging conductive terminals 1241. Similarly, the tongue conductive metal minor abutting structure 12331 is designed as a cantilever structure, enabling the tongue bridging conductive metal 123 to flexibly abut each of the tongue minor bridging conductive terminals 1251, resulting in the tongue conductive metal minor abutting structure 12331 achieving a better abutment with each of the tongue minor bridging conductive terminals 1251.

Furthermore, the tongue conductive metal major separation structure 1234 extends along the tongue conductive plastic base separation wall 1211 within the tongue conductive plastic base major extension channel 1215 and crosses over the tongue major non-bridging conductive terminal 1242 to separate the tongue major non-bridging conductive terminal 1242 from the tongue minor conductive terminal assembly 125, reducing the signal crosstalk between the tongue major non-bridging conductive terminal 1242 and the tongue minor conductive terminal assembly 125, thereby enabling to reduce signal crosstalk and optimize the transmission speed and quality of the connector for specific electronic device requirements and development. The tongue conductive metal minor separation structure 1235 extends along the tongue conductive plastic base separation wall 1211 within the tongue conductive plastic base minor extension channel 1216 and crosses over the tongue minor non-bridging conductive terminal 1252 to separate the tongue major conductive terminal assembly 124 from the tongue minor non-bridging conductive terminal 1252, reducing signal crosstalk and optimizing the transmission speed and quality of the connector for specific electronic device requirements and development.

In the embodiment said above, the tongue component 12 can enter the outer shell interior space 114 through the outer shell bottom embedding port 113 and be embedded in the outer shell component 11 to form an electrical connector combination 10. It should be noted that in the electrical connector combination 10, the joining portion of the tongue major conductive terminal assembly 124 and the tongue minor conductive terminal assembly 125 is exposed on the outer shell terminal joining port 111. When the outer shell component 11 is joining with the joining component 2, the joining portion of the tongue major conductive terminal assembly 124 and the tongue minor conductive terminal assembly 125 electrically joins the joining component 2 to provide signal transmission.

In addition, the outer shell component major separation structure 115, for example, is in the form of a fence structure to separate adjacent two of the plurality of the tongue major bridging conductive terminals 1241 and the tongue major non-bridging conductive terminals 1242 to prevent electrical short circuit between adjacent two of the plurality of the tongue major bridging conductive terminals 1241 and the tongue major non-bridging conductive terminals 1242, providing protection for the plurality of the tongue major bridging conductive terminals 1241 and the tongue major non-bridging conductive terminals 1242. The outer shell component minor separation structure 116, for example, is in the form of a fence structure to separate adjacent two of the plurality of the tongue minor bridging conductive terminals 1251 and the tongue minor non-bridging conductive terminals 1252 to avoid electrical short circuit between adjacent two of plurality of the tongue minor bridging conductive terminals 1251 and the tongue minor non-bridging conductive terminals 1252, providing protection for the plurality of the tongue minor bridging conductive terminals 1251 and the tongue minor non-bridging conductive terminals 1252.

In the embodiment said above, the tongue insulation terminal frame 122 has a tongue insulation terminal frame joining structure 1224. In the electrical connector combination 10, the tongue insulation terminal frame joining structure 1224 is designed to join with the outer shell component 11 using a snapping method, a fastening method, or an interference method, allowing the tongue insulation terminal frame 122 to be joined with the outer shell component 11. Therefore, the tongue insulation terminal frame joining structure 1224 is a snapping structure, fastening structure, or interference structure.

It should be noted that in the above embodiments, certain components may be omitted. For example, in this application, the combined electrical connector includes an outer shell component and a tongue component. The outer shell component is provided to join with a joining component and the outer shell component has an outer shell terminal joining port. The tongue component includes a tongue conductive plastic base, a tongue insulation terminal frame, a tongue bridging conductive metal, a tongue major conductive terminal assembly, and a tongue minor conductive terminal assembly. The tongue major conductive terminal assembly has a plurality of tongue major bridging conductive terminals and tongue major non-bridging conductive terminals. The tongue minor conductive terminal assembly has a plurality of tongue minor bridging conductive terminals and tongue minor non-bridging conductive terminals. The tongue bridging conductive metal includes a tongue conductive metal connection structure, a tongue conductive metal major abutting structure, and a tongue conductive metal minor abutting structure. The tongue conductive plastic base includes a tongue conductive plastic base separation wall, a tongue conductive plastic base major abutting channel, and a tongue conductive plastic base minor abutting channel. The tongue insulation terminal frame includes a tongue insulation terminal frame major joining structure and a tongue insulation terminal frame minor joining structure. The tongue insulation terminal frame major joining structure and the tongue insulation terminal frame minor joining structure are separately joined with one side of the tongue major conductive terminal assembly and the tongue minor conductive terminal assembly to provide positioning for the tongue major conductive terminal assembly and the tongue minor conductive terminal assembly. The tongue conductive plastic base, the tongue insulation terminal frame, the tongue bridging conductive metal, the tongue major conductive terminal assembly, and the tongue minor conductive terminal assembly are combined to form a tongue component combination. In the tongue component combination, the tongue major conductive terminal assembly and the tongue minor conductive terminal assembly are positioned away from the tongue conductive plastic base separation wall. The tongue conductive metal connection structure extends and respectively crosses over the tongue major non-bridging conductive terminal and the tongue minor non-bridging conductive terminal, allowing the tongue conductive metal connection structure to electrically connect to the tongue conductive metal major abutting structure and the tongue conductive metal minor abutting structure, respectively. The tongue conductive metal major abutting structure is abutted with each of the tongue major bridging conductive terminal via the tongue conductive plastic base major abutting channel, and the tongue conductive metal minor abutting structure is abutted with each of the tongue minor bridging conductive terminal via the tongue conductive plastic base minor abutting channel, allowing electrical connection between each of the tongue major bridging conductive terminal and each of the tongue minor bridging conductive terminal. The tongue component is embedded in the outer shell component to form an electrical connector combination. In the electrical connector combination, the joining portion of the tongue major conductive terminal assembly and the tongue minor conductive terminal assembly is exposed on the outer shell terminal joining port. When the outer shell component is joined to the joining component, the joining portion of the tongue major conductive terminal assembly and the tongue minor conductive terminal assembly electrically joins with the joining component.

In summary, the combined electrical connector provided in this application is at least composed of an outer shell component and a tongue component combination. The tongue component is at least composed of a tongue conductive plastic base, a tongue insulation terminal frame, a tongue bridging conductive metal, a tongue major conductive terminal assembly, and a tongue minor conductive terminal assembly. Therefore, even after the electrical connector design is completed, customization of the number, structure, and electrical connection relationship of the conductive terminals can still be achieved through adjustments to the outer shell component and the tongue component to enable the electrical connector to meet the specific requirements and developments of electronic devices.

Furthermore, the tongue bridging conductive metal facilitates electrical connection between the conductive terminals of the electrical connector, reducing signal crosstalk among certain conductive terminals of the electrical connector to enhance the transmission speed and quality of signal through the electrical connector. Additionally, this application eliminates the need for additional bridging components to achieve electrical connection between the conductive terminals of the electrical connector, enabling electronic devices equipped with the combined electrical connector disclosed in this application to continue evolving towards being lightweight, compact, and small.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A combined electrical connector, which is used with a joining component, comprising:

an outer shell component providing joining with the joining component wherein the outer shell component has an outer shell terminal joining port;

a tongue component including a tongue conductive plastic base, a tongue insulating terminal frame, a tongue bridging conductive metal, a tongue major conductive terminal assembly, and a tongue minor conductive terminal assembly; wherein the tongue major conductive terminal assembly includes a plurality of tongue major bridging conductive terminals and a tongue major non-bridging conductive terminal, and the tongue minor conductive terminal assembly includes a plurality of tongue minor bridging conductive terminals and a tongue minor non-bridging conductive terminal;

the tongue bridging conductive metal comprises a tongue conductive metal connection structure, a tongue conductive metal major abutting structure, and a tongue conductive metal minor abutting structure;

the tongue conductive plastic base includes a tongue conductive plastic base separation wall, a tongue conductive plastic base major abutting channel, and a tongue conductive plastic base minor abutting channel;

the tongue insulating terminal frame includes a tongue insulating terminal frame major joining structure and a tongue insulating terminal frame minor joining structure, and the tongue insulating terminal frame major joining structure and the tongue insulating terminal frame minor joining structure are used to respectively join with one side of the tongue major conductive terminal assembly and the tongue minor conductive terminal assembly, providing positioning for the tongue major conductive terminal assembly and the tongue minor conductive terminal assembly; wherein the tongue conductive plastic base, the tongue insulating terminal frame, the tongue bridging conductive metal, the tongue major conductive terminal assembly, and the tongue minor conductive terminal assembly are combined to form a tongue component combination, within the tongue component combination, the tongue major conductive terminal assembly and the tongue minor conductive terminal assembly are away from the tongue conductive plastic base separation wall, and the tongue conductive plastic base separation wall separates the tongue major conductive terminal assembly from the tongue minor conductive terminal assembly, wherein the tongue conductive metal connection structure extends to respectively cross over the tongue major non-bridging conductive terminal and the tongue minor non-bridging conductive terminal, allowing the tongue conductive metal connection structure to respectively electrically connect with the tongue conductive metal major abutting structure and the tongue conductive metal minor abutting structure, and the tongue conductive metal major abutting structure abuts to each of the tongue major bridging conductive terminals via the tongue conductive plastic base major abutting channel, and the tongue conductive metal minor abutting structure abuts to each of the tongue minor bridging conductive terminals via the tongue conductive plastic base minor abutting channel, allowing for the electrical connection of each of the tongue major bridging conductive terminals and each of the tongue minor bridging conductive terminals;

the tongue component is embedded within the outer shell component to form an electrical connector combination, in the electrical connector combination, the contact area of the tongue major conductive terminal assembly and the tongue minor conductive terminal assembly are exposed on the outer shell terminal joining port, allowing the contact area of tongue major conductive assembly and the tongue minor conductive assembly is electrically connected with the joining component when the outer shell component is joined to the joining component.

2. The combined electrical connector of claim 1, wherein the outer shell component further includes an outer shell lingual structure, an outer shell bottom embedding port, and an outer shell interior space, and the outer shell bottom embedding port is located at the bottom of the outer shell lingual structure, while the outer shell interior space is positioned within the interior of the outer shell lingual structure, wherein the outer shell terminal joining port is positioned on the side wall of the outer shell lingual structure, and the tongue component can enter the outer shell interior space through the outer shell bottom embedding port, thereby exposing the contact area of the tongue major conductive terminal assembly and the tongue minor conductive terminal assembly on the outer shell terminal joining port.

3. The combined electrical connector of claim 1, wherein the outer shell component further includes an outer shell component major separation structure and an outer shell component minor separation structure, in the electric connector combination, the outer shell major component separation structure serves to separate adjacent pairs of the plurality of the tongue major bridging conductive terminals from the tongue major non-bridging conductive terminal, and the outer shell minor component separation structure serves to separate adjacent pairs of the plurality of the tongue minor bridging conductive terminals from the tongue minor non-bridging conductive terminal.

4. The combined electrical connector of claim 3, wherein the outer shell component major separation structure and the outer shell component minor separation structure are fence-like structure.

5. The combined electrical connector of claim 1, wherein the tongue conductive plastic base further includes a tongue conductive plastic base supporting structure, and the tongue conductive plastic base supporting structure provides support to the tongue conductive metal connection structure, allowing the tongue conductive metal connection structure to extend on the tongue conductive plastic base.

6. The combined electrical connector of claim 5, wherein the tongue conductive metal connection structure spans across the tongue conductive plastic base separation wall.

7. The combined electrical connector of claim 5, wherein the tongue bridging conductive metal further includes a tongue conductive metal major separation structure and a tongue conductive metal minor separation structure, and the tongue conductive metal major separation structure extends along the tongue conductive plastic base separation wall, bridging over the tongue major non-bridging conductive terminal to separate the tongue major non-bridging conductive terminal from the tongue minor conductive terminal assembly, wherein the tongue conductive metal minor separation structure extends along the tongue conductive plastic base separation wall, bridging over the tongue minor non-bridging conductive terminals to separate the tongue major conductive terminal assembly from the tongue minor non-bridging conductive terminal.

8. The combined electrical connector of claim 7, wherein the tongue conductive plastic base further includes a tongue conductive plastic base major extension channel and a tongue conductive plastic base minor extension channel, and the tongue conductive metal major separation structure extends within the tongue conductive plastic base major extension channel, while the tongue conductive metal minor separation structure extends within the tongue conductive plastic base minor extension channel.

9. The combined electrical connector of claim 7, wherein the tongue conductive metal connection structure, the tongue conductive metal major separation structure, and the tongue conductive metal minor separation structure are interconnected to form a tongue conductive metal structure, and the tongue conductive metal structure has a U-shaped cross-section.

10. The combined electrical connector of claim 1, wherein the tongue insulation terminal frame further includes a tongue insulation terminal frame joining structure, in the electrical connector combination, the tongue insulation terminal frame joining structure is used to connect to the outer shell component through a snap-in, fastening, or interference method.

11. The combined electrical connector of claim 1, wherein the tongue conductive metal major abutting structure comprises a tongue conductive metal major first abutting substructure and a tongue conductive metal major second abutting substructure, and the tongue conductive metal major first abutting substructure is used to abut against each of the tongue major bridging conductive terminals at a tongue conductive metal major first abutting position, while the tongue conductive metal major second abutting substructure is used to abut against each of the tongue major bridging conductive terminals at a tongue conductive metal major second abutting position, wherein the tongue conductive metal major first abutting position and the tongue conductive metal major second abutting position are different; the tongue conductive metal minor abutting structure comprises a tongue conductive metal minor first abutting substructure and a tongue conductive metal minor second abutting substructure, and the tongue conductive metal minor first abutting substructure is used to abut against each of the tongue minor bridging conductive terminals at a tongue conductive metal minor first abutting position, while the tongue conductive metal minor second abutting substructure is used to abut against each of the tongue minor bridging conductive terminals at a tongue conductive metal minor second abutting position, wherein the tongue conductive metal minor first abutting position and the tongue conductive metal minor second abutting position are different.

12. The combined electrical connector of claim 1, wherein the tongue insulation terminal frame comprises a tongue insulation terminal frame major component and a tongue insulation terminal frame minor component, and the tongue insulation terminal frame major joining structure is located on the tongue insulation terminal frame major component, and the tongue insulation terminal frame minor joining structure is located on the tongue insulation terminal frame minor component, wherein the tongue insulation terminal frame major component includes a tongue insulation terminal frame major assembly structure, while the tongue insulation terminal frame minor component includes a tongue insulation terminal frame minor assembly structure, the tongue insulation terminal frame major assembly structure and the tongue insulation terminal frame minor assembly structure are structurally coordinated, allowing the tongue insulation terminal frame major component and the tongue insulation terminal frame minor component to be assembled into a tongue insulation terminal frame combination.

13. The combined electrical connector of claim 12, wherein the tongue conductive plastic base further includes a tongue conductive plastic base assembly structure, and the tongue conductive plastic base assembly structure is respectively structurally coordinated with the tongue insulation terminal frame major assembly structure and the tongue insulation terminal frame minor assembly structure, enabling the tongue insulation terminal frame major component and the tongue insulation terminal frame minor component to be assembled into the tongue insulation terminal frame combination.

14. The combined electrical connector of claim 13, wherein the tongue conductive plastic base assembly structure, the tongue insulation terminal frame major assembly structure, and the tongue insulation terminal frame minor assembly structure are designed with a protrusion and recess structure which are structurally coordinated.

* * * * *